(12) United States Patent
Lee et al.

(10) Patent No.: US 10,496,732 B2
(45) Date of Patent: Dec. 3, 2019

(54) METHOD FOR PROCESSING USER-CUSTOMIZED PAGE AND MOBILE DEVICE THEREOF

(71) Applicant: Samsung Electronics Co. Ltd., Suwon-si, Gyeonggi-do (KR)

(72) Inventors: Chihoon Lee, Seoul (KR); Sanghyuk Koh, Jeju-si (KR); Taeyeon Kim, Seoul (KR); Jihye Myung, Yongin-si (KR); Hyunmi Park, Seoul (KR); Hyemi Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 13/975,824

(22) Filed: Aug. 26, 2013

(65) Prior Publication Data
US 2014/0059426 A1 Feb. 27, 2014

(30) Foreign Application Priority Data
Aug. 27, 2012 (KR) .................. 10-2012-0093761

(51) Int. Cl.
*G06F 17/00* (2019.01)
*G06F 17/21* (2006.01)
*G06F 9/451* (2018.01)

(52) U.S. Cl.
CPC ............ *G06F 17/212* (2013.01); *G06F 9/451* (2018.02)

(58) Field of Classification Search
CPC .................................................. G06F 9/4443
See application file for complete search history.

(56) References Cited

U.S. PATENT DOCUMENTS

| 5,724,985 A * | 3/1998 | Snell et al. .................. 600/510 |
| 6,567,104 B1 * | 5/2003 | Andrew et al. ............... 715/762 |
| 8,005,729 B1 * | 8/2011 | Ulm et al. ..................... 705/30 |
| 2004/0100457 A1 * | 5/2004 | Mandle ................. G06F 1/1626 345/179 |
| 2005/0044508 A1 * | 2/2005 | Stockton ...................... 715/811 |
| 2005/0204310 A1 * | 9/2005 | De Zwart et al. ............ 715/821 |
| 2006/0117197 A1 * | 6/2006 | Nurmi .................. G06F 1/3215 713/323 |
| 2006/0288371 A1 * | 12/2006 | Jun ................... H04M 1/72522 725/52 |
| 2009/0049389 A1 * | 2/2009 | Kuzmanovic ................ 715/745 |
| 2009/0158168 A1 * | 6/2009 | Heo et al. ..................... 715/747 |

(Continued)

FOREIGN PATENT DOCUMENTS

| CN | 101673174 A | 3/2010 |
| CN | 102474293 A | 5/2012 |

(Continued)

*Primary Examiner* — Scott T Baderman
*Assistant Examiner* — Barbara M Level
(74) *Attorney, Agent, or Firm* — Jefferson IP Law, LLP

(57) ABSTRACT

A method for generating and displaying a user-customized page and a mobile device thereof are provided. The method for processing a user-customized page in a mobile device includes collecting use information of a user with respect to the mobile device when a preset specific situation occurs, generating a user-customized page associated with the specific situation using the use information when the specific situation is terminated, and storing the generated user-customized page.

7 Claims, 12 Drawing Sheets

(56) References Cited

U.S. PATENT DOCUMENTS

2009/0160792 A1* 6/2009 Morohoshi ........... G06F 1/1626
                                                    345/173
2009/0221279 A1* 9/2009 Rutledge ..................... 455/418
2011/0034129 A1* 2/2011 Kim et al. .................. 455/41.3
2011/0035675 A1* 2/2011 Kim et al. ................... 715/745

FOREIGN PATENT DOCUMENTS

WO      2009/136194 A2    11/2009
WO      WO 2009136194 A2 *  11/2009  ............. H04L 29/08

* cited by examiner

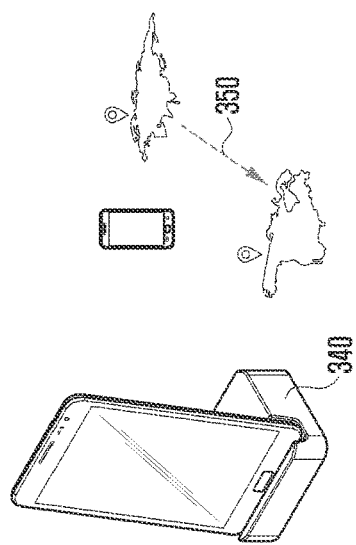
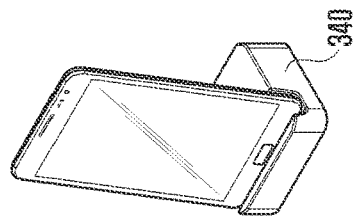
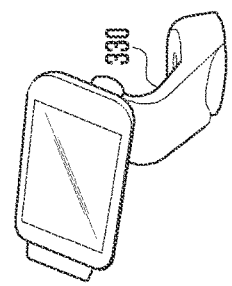
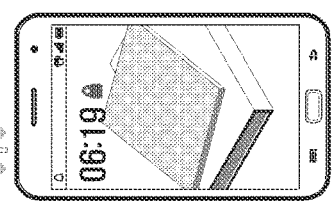
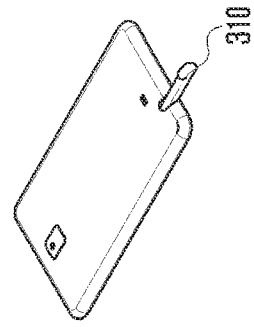

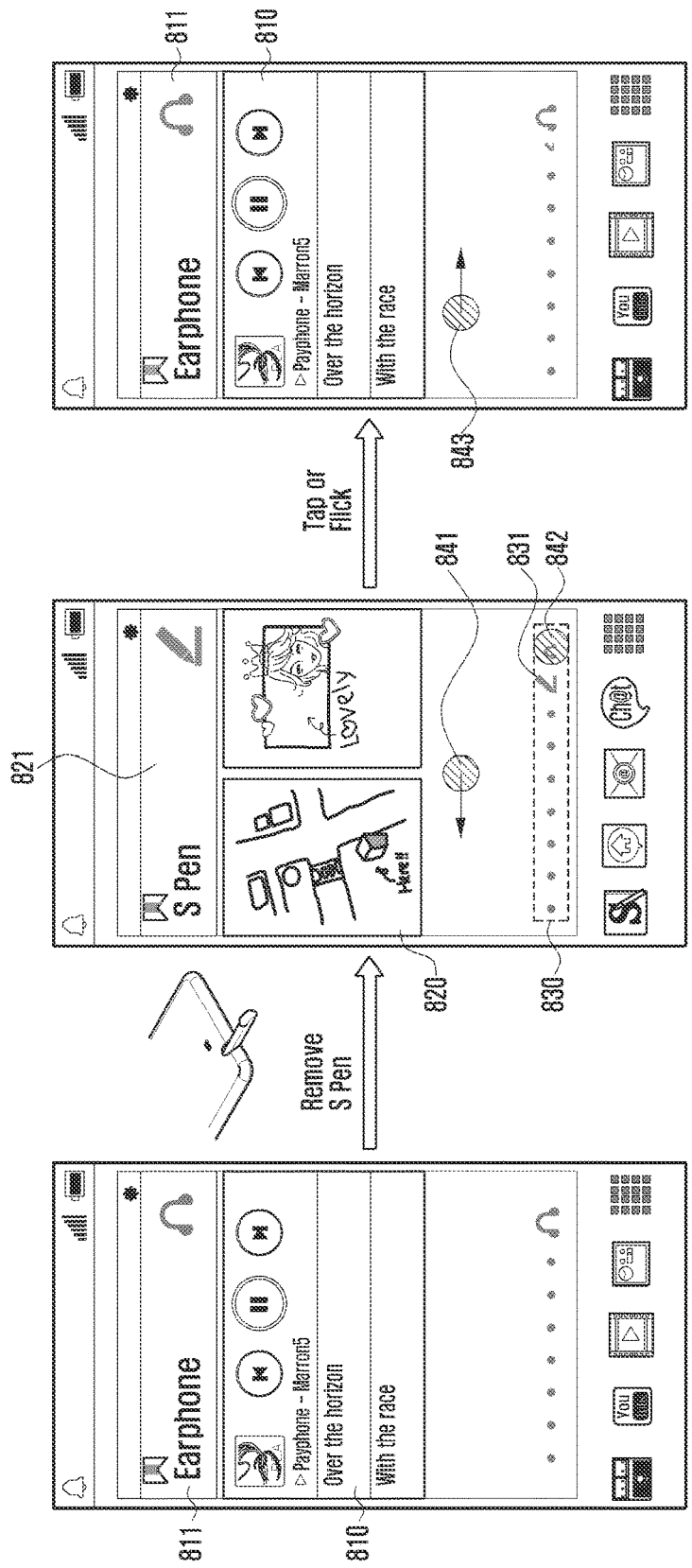

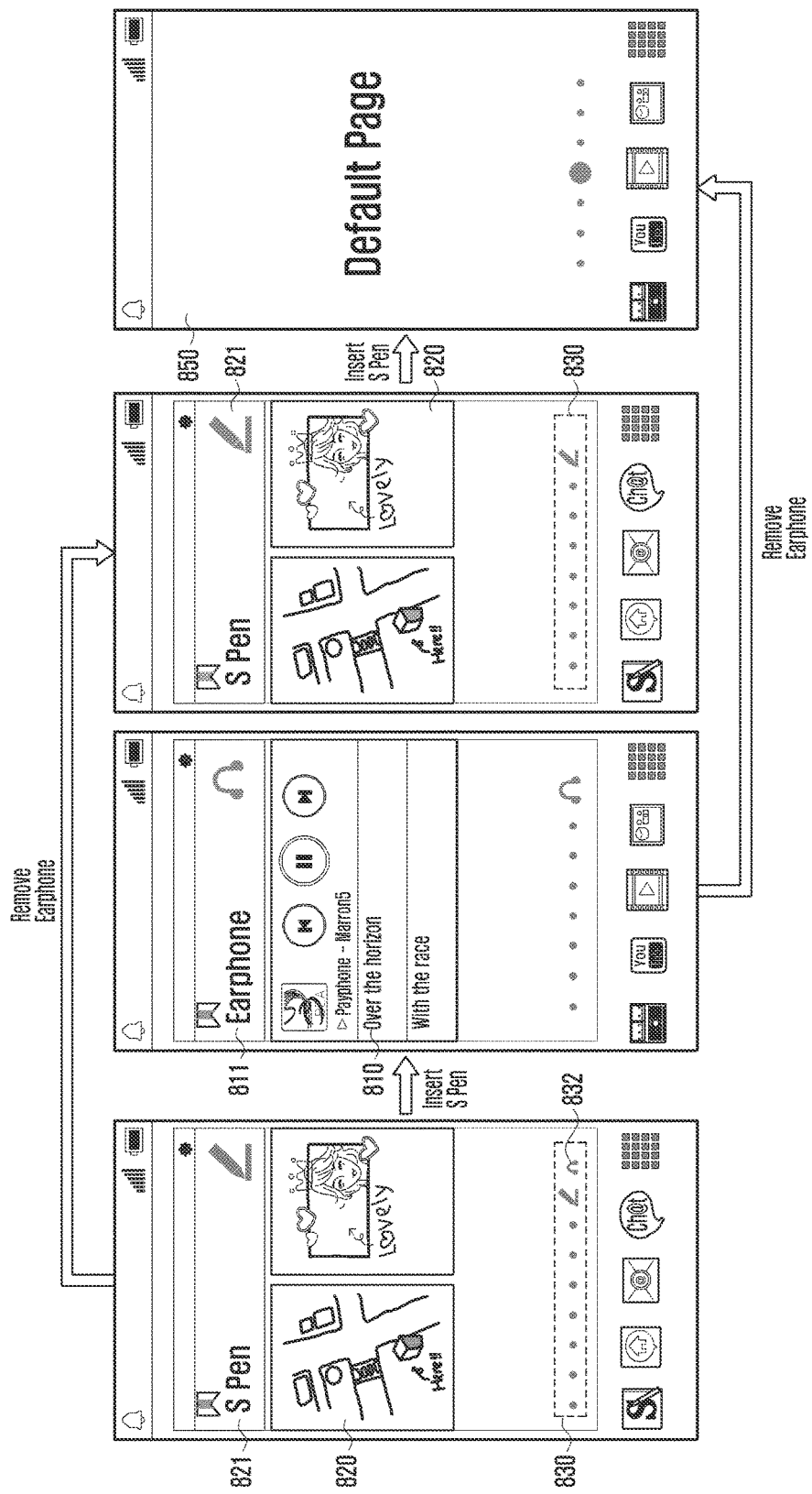

METHOD FOR PROCESSING USER-CUSTOMIZED PAGE AND MOBILE DEVICE THEREOF

CROSS-REFERENCE TO RELATED APPLICATION(S)

This application claims the benefit under 35 U.S.C. § 119(a) of a Korean patent application filed on Aug. 27, 2012 in the Korean Intellectual Property Office and assigned Serial No. 10-2012-0093761, the entire disclosure of which is hereby incorporated by reference.

TECHNICAL FIELD

The present disclosure relates to a method for generating and displaying a user-customized page in a mobile device and a mobile device thereof. More particularly, the present disclosure relates to a method for generating and displaying a user-customized page without participation of a user, and a mobile device thereof.

BACKGROUND

Applications are freely installed and deleted into and from a mobile device, particularly, a smart phone or a tablet Personal Computer (PC). Further, a mobile device generates and displays a page meeting the requirements from a user. The page includes an execution picture of an application or an icon corresponding to the application. For example, the user may use various functions provided from the mobile device through the page.

However, according to a method of processing a page according to the related art as described above, the user must inconveniently and directly operate an input unit of the mobile device to generate the page. Further, if the user does not directly edit the page, the page always has the same configuration. In addition, the user must inconveniently search a page corresponding to a desired function from a plurality of pages.

Therefore, a need exists for a method for generating and displaying a user-customized page without participation of a user, and a mobile device thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for generating and displaying a user-customized page without participation of a user, and a mobile device thereof.

Another aspect of the present disclosure is to provide a method for generating and displaying a user-customized page suited to a use pattern of a user with respect to a mobile device and a mobile device thereof.

Another aspect of the present disclosure is to provide a method for collecting mobile device use information in a preset specific situation (e.g., separation of a pen for touch on a touch screen from a mobile device) when the preset specific situation occurs, and generating and displaying a page using the collected mobile device use information, and a mobile device thereof.

In accordance with an aspect of the present disclosure, a method for processing a user-customized page in a mobile device is provided. The method includes collecting, by a controller, use information of a user with respect to the mobile device when a preset specific situation occurs, generating, by the controller, a user-customized page associated with the specific situation using the use information when the specific situation is terminated, and storing, by a memory, the generated user-customized page.

In accordance with another aspect of the present disclosure, a method for processing a user-customized page in a mobile device is provided. The method includes displaying, by a display panel, a page corresponding to a specific situation among user-customized pages when a preset specific situation occurs, and terminating, by a controller, the displaying of the stored user-customized page when the specific situation is terminated and displaying another page.

In accordance with another aspect of the present disclosure, a mobile device is provided. The mobile device includes an external device interface unit connected to a first external device, a radio frequency communication unit configured to communicate with a second external device, a controller configured to collect use information of a user with respect to the mobile device when a specific situation including at least one of a situation connected to the first external device or a situation communicating with the second external device occurs, and generate a user-customized page associated with the specific situation using the use information when the specific situation is terminated, a memory configured to store the generated user-customized page under control of the controller, and a display panel configured to display the stored user-customized page under control of the controller.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which:

FIGS. 3A to 3E and 4A to 4E illustrate a method for generating a user-customized page according to an embodiment of the present disclosure;

FIGS. 6A to 6E, 7A to 7C, 8A to 8C, and 9A to 9D illustrate a method for displaying a user-customized page according to an embodiment of the present disclosure;

Throughout the drawings, it should be noted that like reference numbers are used to depict the same or similar elements, features, and structures.

DETAILED DESCRIPTION

Figure 1:
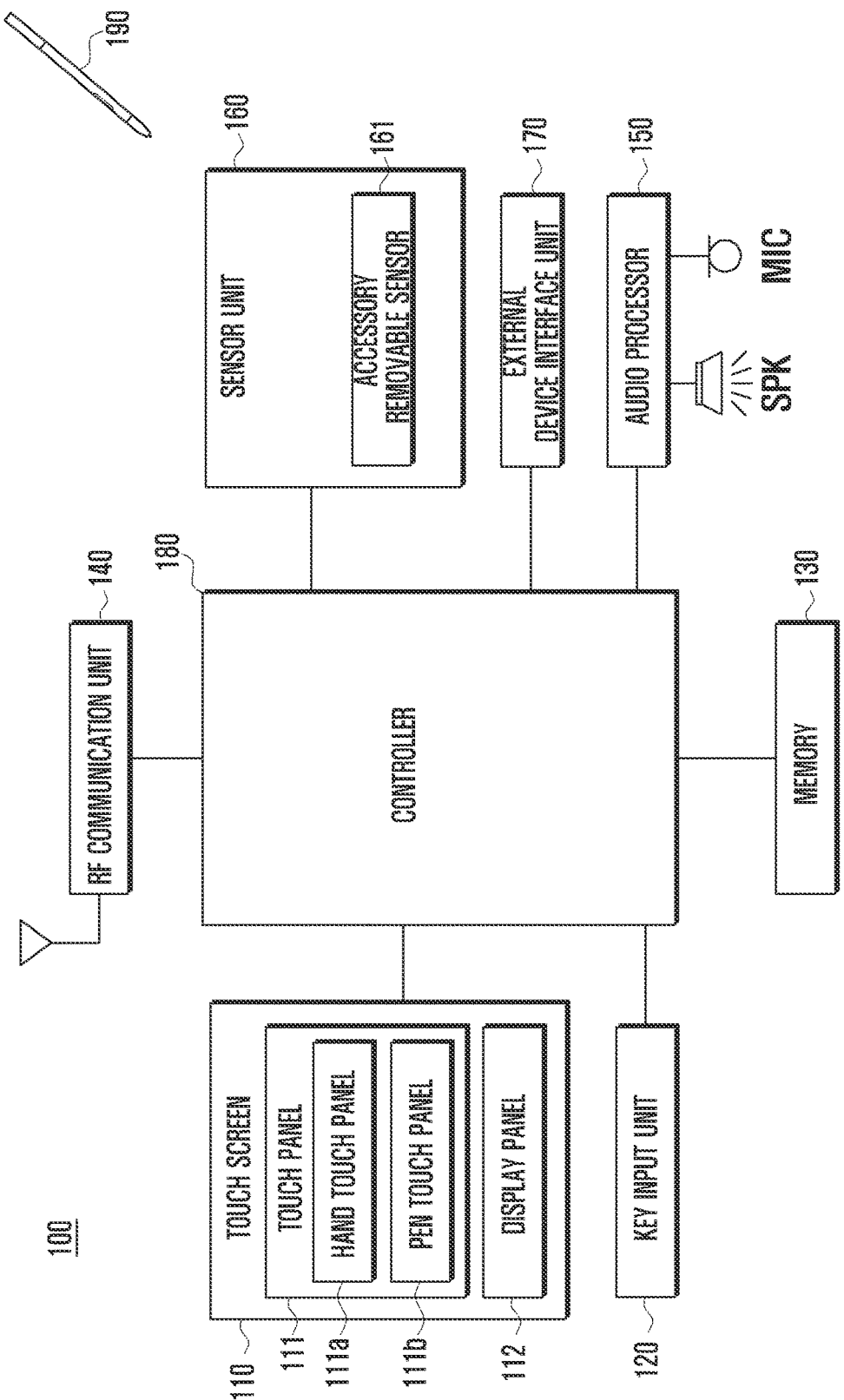
FIG. 1 is a block diagram illustrating a configuration of a mobile device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the present disclosure, the mobile device refers to a portable electronic device, such as a portable phone, a smart phone, a tablet Personal Computer (PC), a notebook PC, and the like.

For example, the accessory is one of constituent elements of the mobile device and may be an accessory of the mobile device movable from the mobile device. For example, the accessory may include a pen and a keypad for touching a touch screen.

In the present disclosure, an external device is a device capable of performing data communication with the mobile device, and is connected to the mobile device in a wired or wireless scheme. For example, the external device may include a headphone, a charger, other mobile devices, a server, a base station, an audio device, a TV, a navigation device, a cradle, and the like. The cradle has various electrical functions (e.g., charging the mobile device, receiving and outputting audio data from the mobile device) as well as a physical function supporting the mobile device.

In the present disclosure, the specific situation includes a situation where an accessory is separated from the mobile device, a situation where a first external device is connected to the mobile device, and a situation where the mobile device communicates with a second external device. The first external device is the same as the second external device. For example, an external device connected to the mobile device and communicating with the mobile terminal may include a headphone with a microphone. For example, the mobile device may be connected to the headphone through an ear jack to receive a voice signal from a microphone of the headphone. The first external device may be different from the second external device. For example, the first external device may be a charger and the second external device may be another mobile device connected through a wireless communication network.

Mobile device use information of the present disclosure includes information on an Application (App) executed by a user in the specific situation, information on a function executed by the user among functions of the App, data generated by the executed function, data received from an external device by the executed function, and an environment setting value of a mobile device set by the user in the specific situation.

A page of the present disclosure refers to a basic page manufactured by a manufacturing company and basically provided to the user or a user-customized page generated suited to a corresponding user of the mobile device. More particularly, hereinafter, according to examples of the present disclosure, the user-customized page is a page generated using the mobile device use information. Further, the user-customized page is classified by the specific situations.

Hereinafter, a method for processing a user-customized page and a mobile device thereof will be described below. The processing of the user-customized page includes generation, edition, deletion, display, and storage of the user-customized page.

FIG. 1 is a block diagram illustrating a configuration of a mobile device according to an embodiment of the present disclosure.

Referring to FIG. 1, a mobile terminal 100 includes a touch screen 110, a key input unit 120, a memory 130, a Radio Frequency (RF) communication unit 140, an audio processor 150, a speaker SPK, a microphone MIC, a sensor unit 160, an external device interface unit 170, a controller 180, and a stylus pen 190.

The touch screen 110 includes a touch panel 111 and a display panel 112. The touch panel 111 may be placed on the display panel 112. The touch panel 111 may be classified into an add-on type touch panel which is placed on the display unit 112 and an on-cell type touch panel or an in-cell type touch panel which is embedded in the display unit 112.

The touch panel 111 generates an analog signal (e.g., a touch event) in response to a user gesture with respect to the touch panel 111, converts the analog signal into a digital signal, and transfers the digital signal to the controller 180. The controller 180 may detect a user gesture from a transferred touch event. The controller 180 controls the constituent elements in response to the detected user gesture. The user gesture may be classified into a touch and a tough gesture. The touch gesture may include a tap, a drag, and a flick. For example, the touch means a state contacted on the touch screen. The touch gesture means a motion from touch-on of the touch on the touch screen to touch-off of the touch.

The touch panel 111 may be a combination touch panel which includes a hand touch panel 111a for detecting a hand gesture and a pen touch panel 111b for detecting a pen gesture. The hand touch panel 111a may include a capacitive type touch panel. The hand touch panel 111a may include a resistive type touch panel, an infrared beam type touch panel, or an ultrasonic type touch panel. The hand touch panel 111a may generate a touch event by not only the hand gesture of the user but may generate the touch event by another object (e.g., an object of a conductive material providing variation in capacitance). The pen touch panel 111b may include an electromagnetic induction type touch panel. Accordingly, the pen touch panel 111b generates a touch event by a specially manufactured stylus pen 190 to form a magnetic field.

The display panel 112 converts image data input from the controller 180 into an analog signal to display the analog signal under control of the controller 180. For example, the display unit 112 may provide various pictures, for example, a lock picture, a home picture, an environment setting picture, an application (hereinafter referred to as 'App') execution screen, a keypad, and the like. A lock picture is a picture displayed on the display panel 112 when the display panel 112 is turned on. When a user gesture for releasing a lock occurs, the controller 180 may change a displayed picture from a lock picture to a home picture or an App execution picture. The home picture includes a plurality of pages and a page selected by the user from the pages is displayed. The page may be an empty page or may include at least one application execution picture or at least one icon. The icon corresponds to an application (e.g., an environment setting, a browser, a call, a message, and the like). If the icon is selected by the user (e.g., tap the icon), the controller 180 executes a corresponding App and controls the display panel 112 to display the executed picture.

The display panel 112 may display one picture (e.g., a page of a home picture) among the pictures as a background and display another picture (e.g., a keypad) to overlap with the background as a foreground under control of the controller 180. In addition, the display panel 112 may display a plurality of pictures not to overlap with each other under the control of the controller 180. For example, the display panel 112 may display one of the pictures on a first screen region and display the other on a second screen region. The display panel 112 may be configured by a Liquid Crystal Display (LCD), an Organic Light Emitted Diode (OLED), or an Active Matrix Organic Light Emitted Diode (AMOLED).

The key input unit 120 may include a plurality of keys (buttons) for receiving numeric or character information and for setting various functions. The keys may include a menu fetch key, a picture on/off key, a power on/off key, a volume control key, and the like. The key input unit 120 generates and transfers a key event associated with a user setting and function control of the portable terminal 100 to the controller 180. The key event may include a power on/off event, a volume control event, a picture on/off event, and the like. The controller 180 controls the foregoing constituent elements in response to the key event. The key (button) of the key input unit 120 refers to a hard key and a key (button) displayed on the touch screen 110 and may also refer to a soft key.

The memory 130 is a secondary memory unit of the controller 180, and may include a disc, a Random Access Memory (RAM), a Read Only Memory (ROM), and a flash memory. The memory 130 may store data generated from the mobile device 100 or data received from an external device (e.g., a server, a desktop PC, a tablet PC, and the like) through the RF communication unit 140 or an external device interface unit (not shown).

The memory 130 stores a booting program and an operating system for operating the mobile device 100. Further, the memory 130 stores a page processing program of the present disclosure. A page generation program includes a function for collecting mobile device use information when a specific situation occurs and a function for generating and storing a user-customized page associated with a corresponding specific situation using the collected use information. A page display program includes a function for displaying the stored user-customized page when the specific situation occurs and a function for terminating the display of the user-customized page when the specific situation is terminated and displaying a default page (e.g., a page finally displayed before generation of the specific situation or a preset basic page).

The memory 130 includes an embedded application and a 3rd party application. The embedded application refers to an application embedded in the mobile device 100. For example, the embedded application may include a browser, an e-mail, an instant messenger, and the like. As generally known in the art, the $3^{rd}$ party application refers to an application which may be downloaded and installed in the mobile device 100 from an on-line market, and include various applications. The $3^{rd}$ application is freely installed and deleted. If the mobile device 100 is turned-on, the booting program is loaded into a main memory unit (e.g., a RAM) of the controller 180. The booting program loads the Operating System (OS) into the main memory unit so that the mobile device 100 may operate. Further, the OS is executed by loading applications into the main memory unit. The booting and the loading are generally known in a computer system, and thus a detailed description thereof is omitted.

The RF communication unit 150 performs a voice call, an image call, or data communication with the external device under the control of the controller 180. To this end, the RF communication unit 140 may include an RF transmitter for up-converting a frequency of a transmitted signal and amplifying the converted signal, and an RF receiver for low-noise-amplifying a frequency of a received signal and down-converting the amplified signal. The RF communication unit 140 may include a mobile communication module (e.g., 3-generation mobile communication module, 3.5-generation mobile communication module, or 4-generation mobile communication module, etc.), and a digital broadcasting module (e.g., a Digital Multimedia Broadcasting (DMB) module or a Bluetooth module).

The audio processor 150 performs voice recognition, voice recording, digital recording, and input and output functions of an audio signal for a call function by a combination of the speaker SPK and the microphone MIC. The audio processor 150 receives an audio signal (e.g., a voice signal guiding that the accessory is separated, and a voice signal guiding that the external device is connected) from the controller 180, converts the received audio signal into an analog signal, amplifies the analog signal, and outputs the amplified analog signal to the speaker SPK. The audio processor 150 converts an audio signal received from the microphone MIC into a digital signal and provides the digital signal to the controller 180. The speaker SPK converts the audio signal received from the audio processor 150 into a sound wave and outputs the sound wave. The microphone MIC converts the sound wave from a person or other sound sources into an audio signal.

The sensor unit 160 detects a physical amount (e.g., speed, acceleration, altitude, and the like) and variation therein. More particularly, according to the present disclosure, the sensor unit 160 includes an accessory removable sensor 161 which transfers a separation guide signal to the controller 180 when the accessory (e.g., the stylus pen 190)

is separated from the mobile device 100, and transfers a connection guide signal to the controller 180 when the accessory is connected to the mobile device 100. For example, when a magnet is attached to the accessory, the accessory removable sensor 161 includes a hall sensor. For example, if a first contact point of the magnet is separated from a second contact point of the hall sensor, the accessory removable sensor 161 outputs a separation guide signal to the controller 180. Here, the separation guide signal includes information identifying a corresponding accessory. Accordingly, when there is a plurality of accessories, the controller 180 may recognize which one of the accessories is separated from the mobile device 100. If the first contact point adheres to the second contact point, the accessory removable sensor 161 transfers the connection guide signal to the controller 180. Here, the connection guide signal includes information identifying a corresponding accessory. Accordingly, the controller 180 may recognize a connected accessory.

The external device interface unit 170 is connected to an external device (e.g., other mobile devices, a desktop PC, a notebook PC, a headphone, a cradle, and the like) and performs data communication under the control of the controller 180. The cradle includes various electrical functions (e.g., charging the mobile device, receiving and outputting audio data from the mobile device) as well as a physical function supporting the mobile device. The external device interface unit 170 may include connectors corresponding to external devices. For example, the external device interface unit 170 may include a connector for charging and data communication and an ear-jack for connecting with a headphone. The controller 180 may recognize presence of connection of the external device. For example, when the external device is connected to the external device interface unit 170, the external device interface unit 170 outputs information (for example, different voltages by external devices) indicating what a connected external device is to the controller 180. If the external device is separated, the external device interface unit 170 outputs information (e.g., a ground (GND) voltage) indicating that the external device is separated to the controller 180.

The controller 180 controls an overall operation and signal flow between internal constituent elements of the mobile device 100, processes data, and controls supply of power from a battery to the constituent elements. The controller 180 may include a main memory device for storing an application program and an operating system, a cache memory for temporarily storing data to be written to the memory 130 and for temporarily storing data read from the memory 130, a Central Processing Unit (CPU), and a Graphic Processing Unit (GPU). The operating system serves as an interface between a hardware and a program, and manages a computer resource, such as the CPU, the GPU, the main memory device, and a secondary memory device. For example, the operating system operates the mobile device 100, determines an order of a task, and controls calculation of the CPU and calculation of the GPU. The operating system performs a function for controlling execution of an application program and a function for managing storage of data and files. The CPU is a core control unit of a computer system for performing computation and comparison of data, and interpretation and execution of a command. The GPU is a graphic control unit for performing computation and comparison of data associated with graphics, and interpretation and execution of a command. Each of the CPU and the GPU may be configured by integrating at least two independent cores (e.g., a quad-core) as one package being a single Integrated Circuit (IC). The CPU and the GPU may be a System on Chip (SoC). The CPU and the GPU may be a package of a multi-layer structure. A configuration including the CPU and the GPU may refer to an Application Processor (AP). A characteristic technology of the controller 180, that is, processing of the user-customized page will be described below.

Since the structural elements can be variously changed according to convergence trend of a digital device, no elements can be listed. The mobile device 100 may include constructions that are not mentioned, such as a Global Positioning System (GPS) module, a Near Filed Communication (NFC) module, a vibration module, and a camera. The GPS module may be used as an application for recognizing an internationally roamed zone. The vibration motor may be used as an application for guiding that a specific situation occurs and is terminated to the user. Further, the mobile device 100 may be substituted by specific constructions in the foregoing arrangements according to the provided form or another structure.

Figure 2:
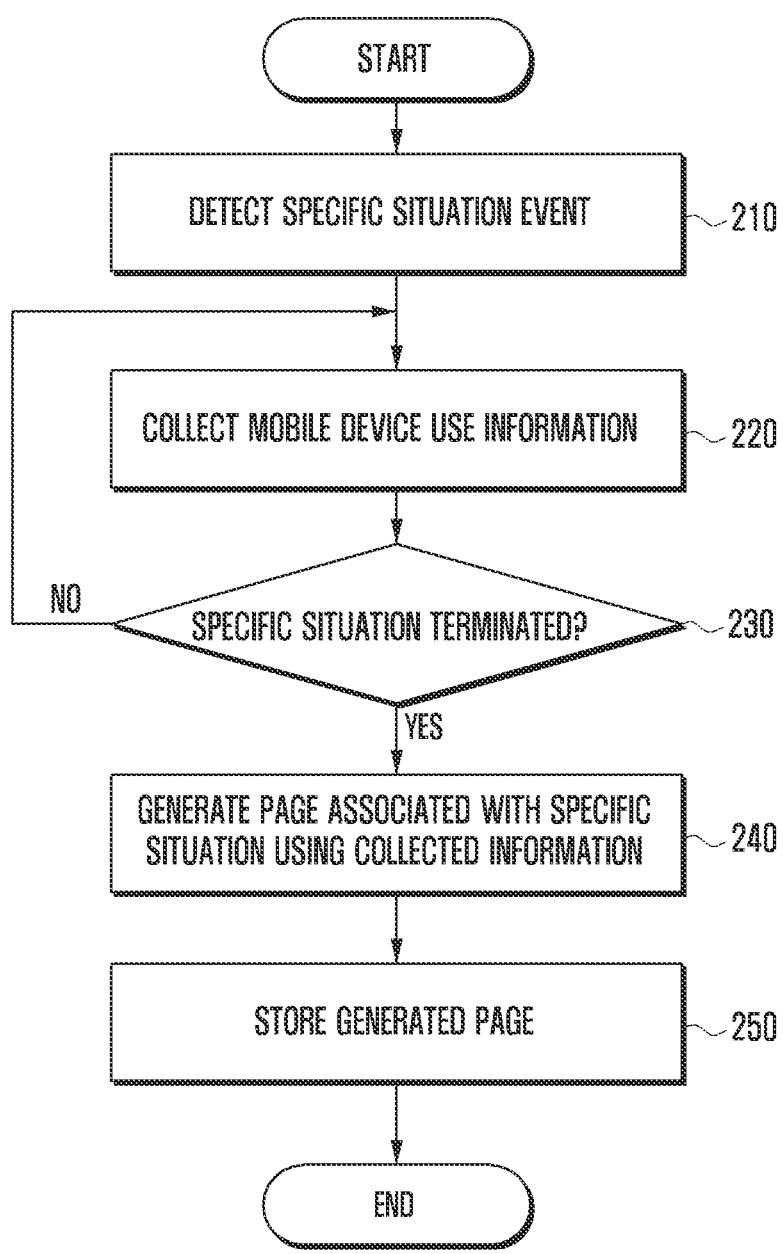
FIG. 2 is a flowchart illustrating a method for generating a user-customized page according to an embodiment of the present disclosure.

FIG. 2 is a flowchart illustrating a method for generating a user-customized page according to an embodiment of the present disclosure. FIGS. 3A to 3E, and 4A to 4E illustrate a method for generating a user-customized page according to an embodiment of the present disclosure.

Referring to FIGS. 2 to 4E, the controller 180 detects an event indicating the occurrence of a specific situation at operation 210. For example, referring to FIG. 3, the controller 180 may detect an event indicating that a stylus pen 310 is separated from the mobile device from the sensor unit 160, detects an event indicating that a headphone 320 is connected from an external device interface unit 170, detects an event indicating that a car cradle 330 is connected from the external device interface unit 170, detects an event indicating that a desk cradle 340 is connected from the external device interface unit 170, or receives an international roaming signal 350 from the RF communication unit 140.

Figure 4D:
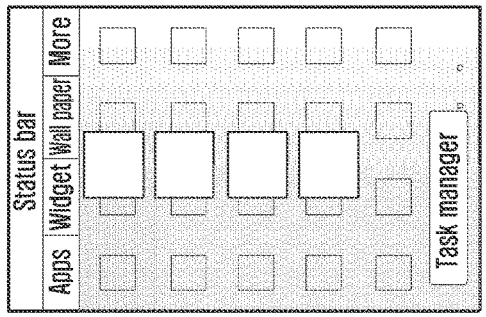
Figure 4C:
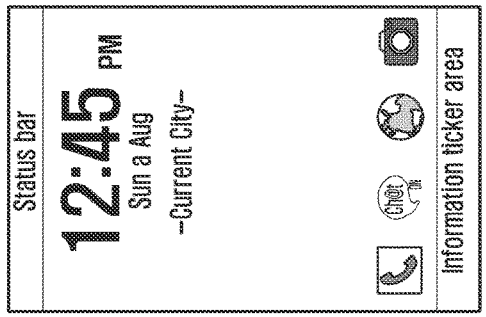
Figure 4B:
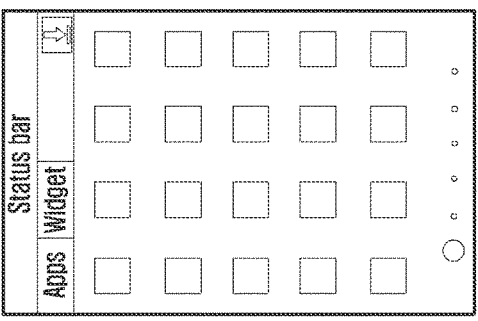
Figure 4A:
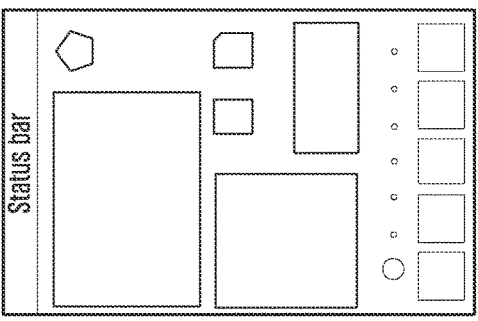
Figure 4E:
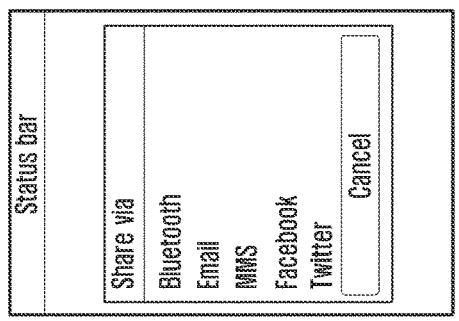

If the specific situation event is detected, the controller 180 collects mobile device use information from a time point when the specific situation event is detected, and stores the collected information in the memory 130 at operation 220. For example, the controller 180 collects information of an application executed through a home picture (FIG. 4A), a menu picture (FIG. 4B), a lock picture (FIG. 4C), a recently executed application list (FIG. 4D), and a pop-up menu (FIG. 4E). Further, the controller 180 collects information of a function (e.g., hand character of a note) executed by the user from an executed App (e.g., a note). In addition, the controller 180 collects data generated by the executed function (e.g., note generated by a hand character function). Further, the controller 180 collects data (e.g., images) received from an external device by the executed function. Further, the controller 180 collects an environment setting value of the mobile device 100 set by the user (e.g., sets silent mode to OFF, and sets a drive mode to ON). The collected information is periodically updated based on at least one of a used frequency or a used time point. For example, the controller 180 deletes information where 40 days elapse from collected information. When a used frequency of an App for the past 10 days is less than 100 times, the controller 180 deletes information of a corresponding App. When the user has not used the App for the past 5 days, the controller 180 deletes information of a corresponding App.

The controller 180 determines whether the specific situation is terminated at operation 230. For example, if an event indication that the stylus pen 310 is connected to the mobile device is detected from the sensor unit 160, the controller 180 determines that the specific situation (i.e., separation of the stylus pen 310) is terminated. When reception of data (e.g., movie files) from the external device through the RF communication unit 140 is terminated, the controller 180 determines that the specific situation (that is, communication with the external device) is terminated. When an event indicating that connection of the external device is released is detected from the external device interface unit 170, the controller 180 determines that the specific situation (that is, connection with the external device) is terminated. When the specific situation is terminated, the controller 180 generates a user-customized page associated with a specific situation using collected information at operation 240. For example, when the specific situation is a 'pen separation' and collected information includes memo created by the pen, the generated user-customized page includes a title of the 'pen' and the memo. The controller 180 stores the generated page in the memory 130 at operation 250. The generated page may be stored in the external device. For example, the controller 180 controls the RF communication unit 140 to transmit the generated page to the external device (e.g., a cloud server). Further, the generated page may be stored in the external device.

Figure 5:
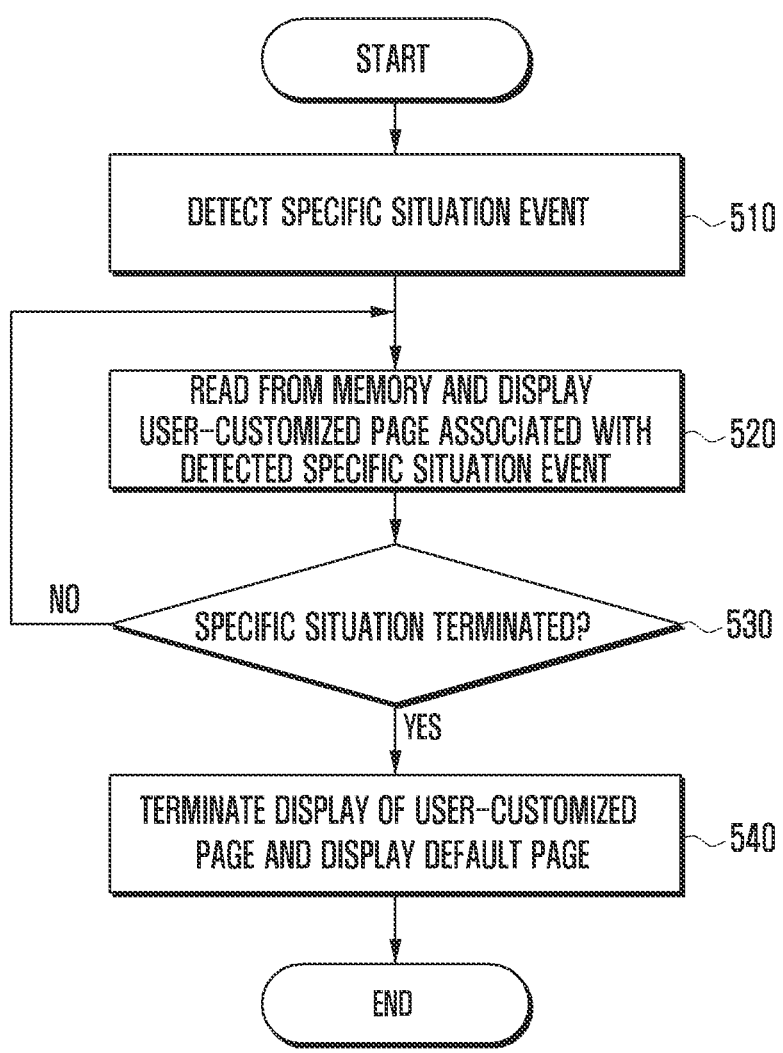
FIG. 5 is a flowchart illustrating a method for displaying a user-customized page according to an embodiment of the present disclosure.

FIG. 5 is a flowchart illustrating a method for displaying a user-customized page according to an embodiment of the present disclosure. FIGS. 6A to 6E, 7A to 7C, 8A to 8C, and 9A to 9D illustrate a method for displaying a user-customized page according to an embodiment of the present disclosure.

Referring to FIG. 5, the controller 180 detects a specific situation event at operation 510. If the specific situation event is detected, the controller 180 reads a user-customized page associated with the detected specific situation event from the memory 130, and controls the touch screen 110 to display the read page at operation 520.

Figures 6A, 6B, 6C, 6D, 6E:
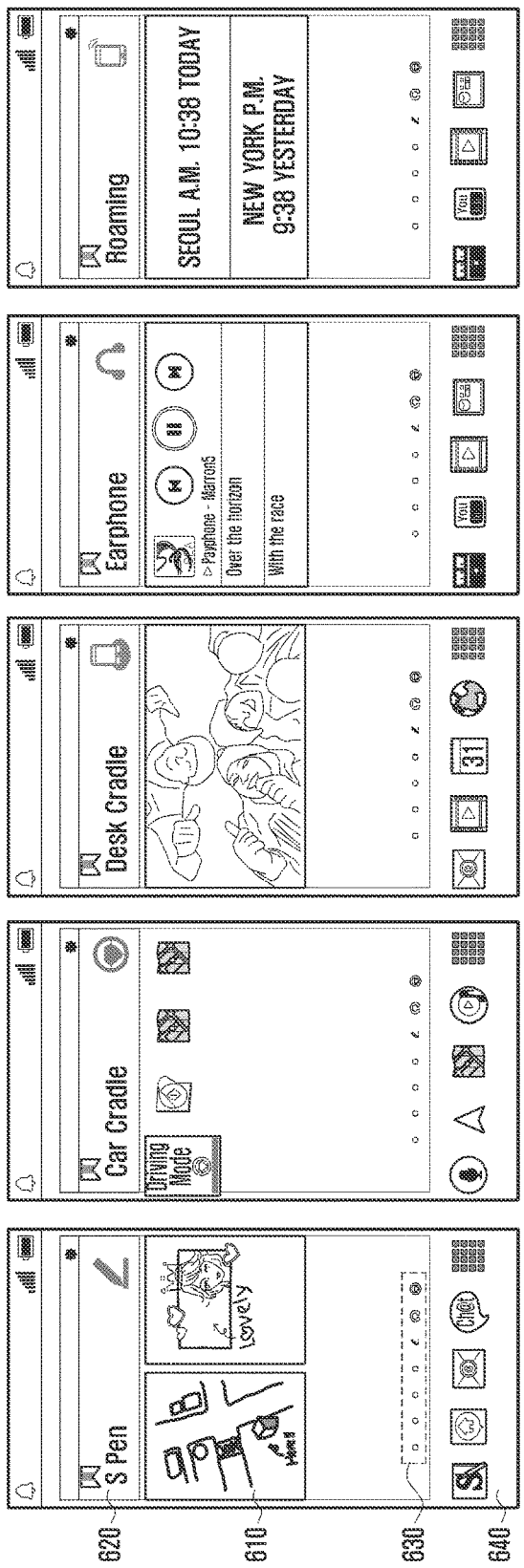

Referring to FIG. 6A, when the specific situation is the 'pen separation', the touch screen 110 displays a page (e.g., including a memo) associated with the pen separation.

Referring to FIG. 6B, when the specific situation is a 'car cradle connection', the touch screen 110 displays a page associated with the car cradle (e.g., including an icon for setting a use environment of the mobile device 100 to a drive mode, an icon for guiding a road to an office, and an icon for guiding a road to home).

Referring to FIG. 6C, when the specific situation is a 'desk cradle connection', the touch screen 110 displays the page (e.g., including a photograph) associated with a desk cradle.

Referring to FIG. 6D, when the specific situation is a 'headphone connection', the touch screen 110 displays a page associated with the headphone (e.g., including an execution picture of a music player).

Referring to FIG. 6E, when the specific situation is an 'international roaming', the touch screen 110 displays a page associated with international roaming (e.g., including current time of Seoul and current time of international roaming zone (e.g., New York)).

Referring back to FIG. 6A, when a corresponding page 610 is the user-customized page, the touch screen 110 displays a title 620, a page list 630 including indicators indicating respective pages, and an application list 640 which the user frequently uses together with the page 610. An indicator corresponding to a currently displayed page among indictors is highlighted and displayed. For example, the indicator of a displayed page is displayed larger or darker than other indicators. An indicator indicating a user-customized page among the indicators is displayed in the form of discriminating to which specific situation a corresponding page is related. For example, when the specific situation is a "pen separation", the corresponding indicator is a shape of a "pen". When the specific situation is a "headphone connection", the corresponding indicator is a "headphone" shape. When the specific situation is a "car cradle connection", the corresponding indicator is a "car" shape.

The controller 180 determines whether the specific situation is terminated at operation 530. When the specific situation is terminated, the controller 180 terminates display of a corresponding page and controls the touch screen 110 to display a default page at operation 540.

Figures 7A, 7B, 7C:
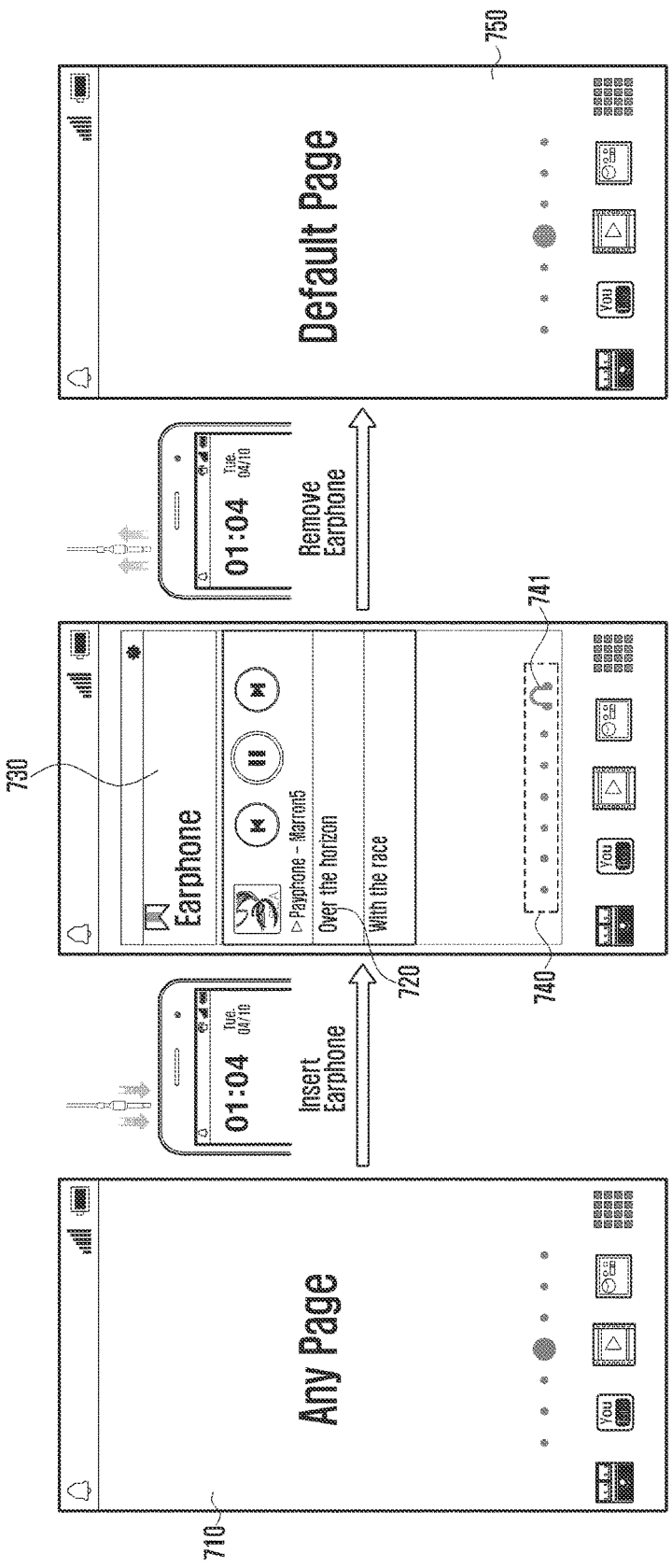

For example, referring to FIGS. 7A to 7C, the touch screen 110 displays a first page 710 on a home picture under control of the controller 180. When "headphone connection" occurs while the first page 710 is displayed, the controller 180 controls the touch screen 110 to display a second page 720 associated with the "headphone connection". Further, the controller 180 controls the touch screen 110 to display a title 730 of the second page 720. Further, the controller 180 adds an indicator 741 of the second page 720 to a page list 740, and controls the touch screen 110 to highlight and display the page list 740 to which the indicator 741 is added. When the headphone is separated, the controller 180 controls the touch screen 110 to terminate display of the second page 720 and to display the third page, that is, a default page 750. The default page 750 may be a page, that is, the first page 710 displayed before the headphone is connected. Further, the controller 180 terminates display of the title 730 and deletes the indicator 741 from the page list 740.

As another example, referring to FIG. 8A, the touch screen 110 displays a first page 810 associated with "headphone connection" under control of the controller 180. When the "pen separation" occurs while the first page 810 displayed, the controller 180 controls the touch screen 110 to display a second page 820 associated with "pen separation". Further, the controller 180 controls the touch screen 110 to display a second title 821 of the second page 820 instead of a first title 811 of the first page 810. Further, the controller 180 adds an indicator 831 of the second page 820 to a page list 830, and controls the touch screen 110 to highlight and display the page list 830 to which the indicator 831 of the second page 820 is added.

Referring to FIG. 8B, if a flick 841 to a left side on the second page 820 or a tap 842 with respect to an indicator of the first page 810 from the page list 830 is detected, the controller 180 controls the touch screen 110 to display the first page 810 and the first title 811 thereof.

Referring to FIGS. 8C and 9A, if a flick 843 to a right side on the first page 810 is detected, the controller 180 controls the touch screen 110 to display the second page 820 and the second title 821 thereof.

Referring to FIG. 9B, when "pen connection" is achieved in a state of FIG. 9A, the controller 180 terminates display of the second page 820 associated with the pen and the second title 821 thereof and controls the touch screen 110 to display a previous page, that is, the first page 810.

Referring to FIG. 9D, when "headphone separation" is achieved in a state of FIG. 9B, the controller 180 terminates display of the first page 810 associated with a headphone and the first title 811 thereof, and displays a default page 850.

Referring to FIG. 9C, when "headphone separation" is achieved in a state of FIG. 9A, the controller 180 controls the touch screen 110 to disappear an indicator 832 of the second page 820 associated with the headphone from the page list 830. Referring back to FIG. 9D, when "pen connection" is achieved in a state of FIG. 9C, the controller 180 terminates display of the second page 820 associated with the pen and the second title 821 thereof, and displays a default page 850.

Figure 10:
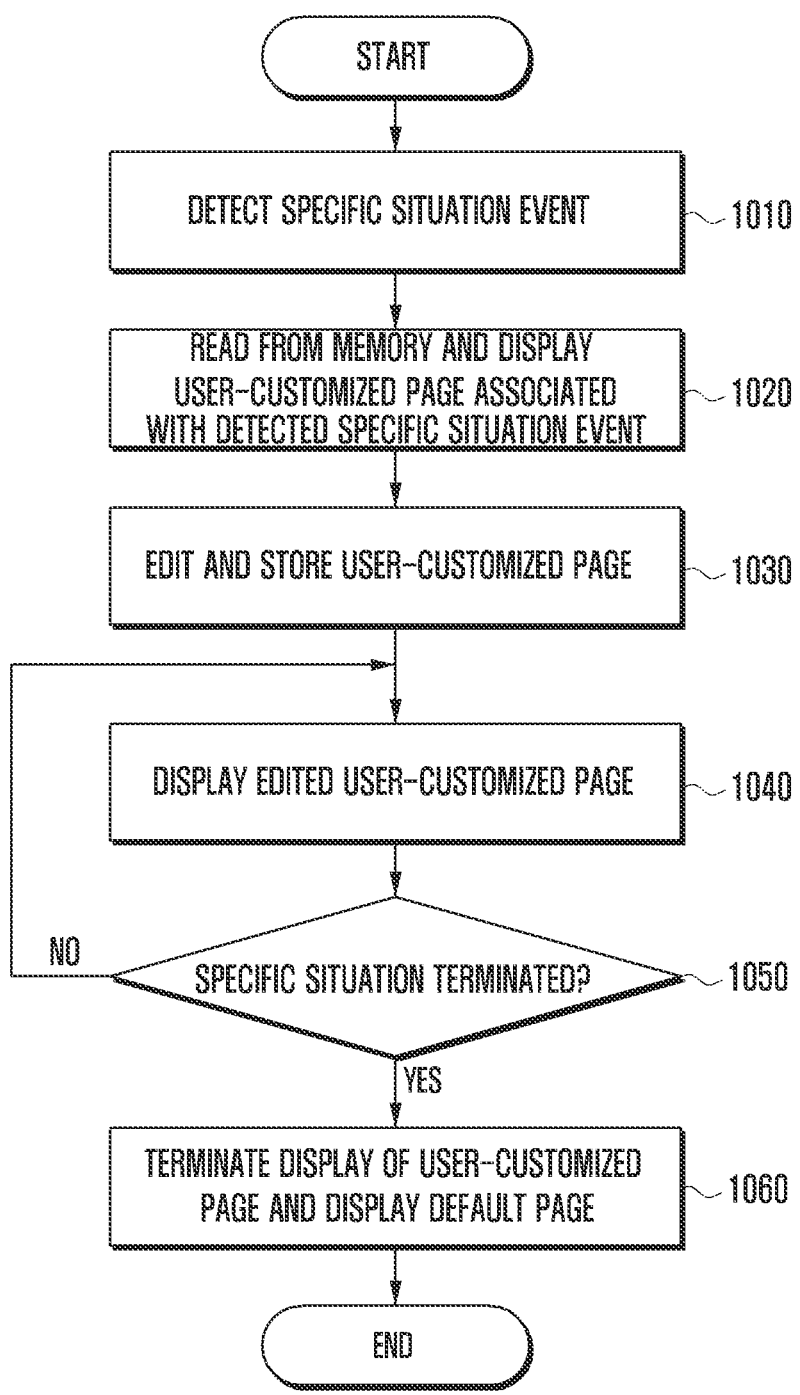
FIG. 10 is a flowchart illustrating a method for editing a user-customized page according to an embodiment of the present disclosure.

FIG. 10 is a flowchart illustrating a method for editing a user-customized page according to an embodiment of the present disclosure. FIGS. 11A to 11D illustrate a method for editing a user-customized page according to an embodiment of the present disclosure.

Referring to FIG. 10, the controller 180 detects a specific situation event at operation 1010. If the specific situation event is detected, the controller 180 reads a user-customized page associated with the detected specific situation event from the memory 130, and controls the touch screen 110 to display the read page at operation 1020. The controller 180 edits and stores a user-customized page at operation 1030.

Figure 11:
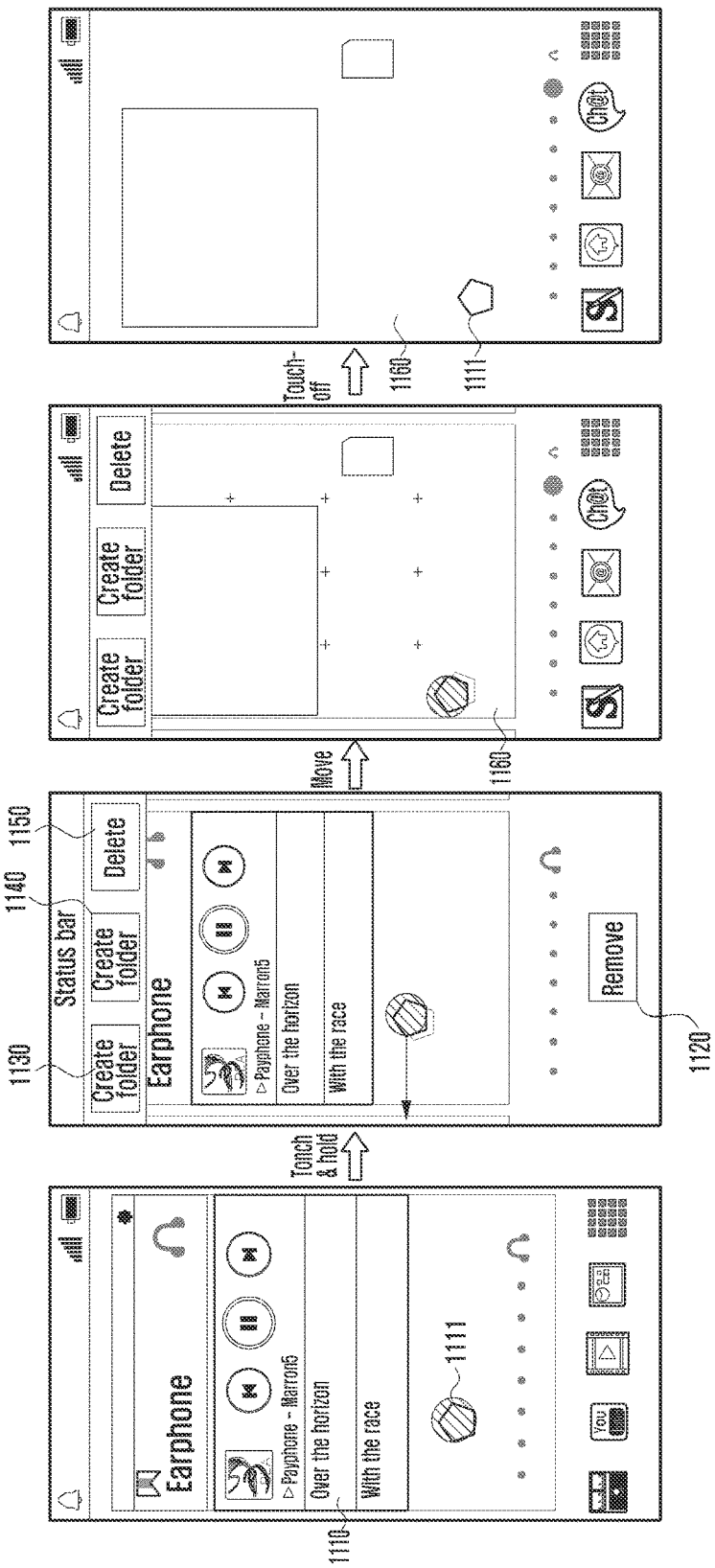
FIGS. 11A to 11D illustrate a method for editing a user-customized page according to an embodiment of the present disclosure.

For instance, referring to FIG. 11A, the touch screen 110 displays a first page 1110 associated with the "headphone connection" under control of the controller 180.

Referring to FIG. 11B, the first page 1110 includes an icon 1111 corresponding to an application (e.g., a music player). If the icon 1111 is touched and the touch is held for a preset time, for example, 2 seconds, the controller 180 controls the touch screen 110 to display edit buttons. For example, the touch screen 110 displays a delete button 1120 for deleting the icon 1111 from the first page 111. For instance, if the icon 1111 is moved to overlap with the delete button 1120, the controller 180 deletes the icon 1111 from the first page 1110. Further, the touch screen 110 displays a folder generation button 1130 for adding a folder to a first page 1110, a page generation button 1140 for generating a new page, and a delete button 1150 for deleting the touched icon 1111 and a corresponding application.

Meanwhile, referring to FIGS. 11C and 11D, if the user moves (that is, drags) the icon 1111 to a left side, the controller 180 controls the touch screen 110 to display a second page 1160. If the user releases the touch, the controller 180 places the icon 1111 on the second page 1140.

The controller 180 displays an edited user-customized page (the first page 1110 from which the icon 1111 is deleted) at operation 1040.

The controller 180 determines whether the specific situation is terminated at operation 1050. When the specific situation is terminated, the controller 180 terminates display of a corresponding page and controls the touch screen 110 to display a default page at operation 1060.

Figure 12:
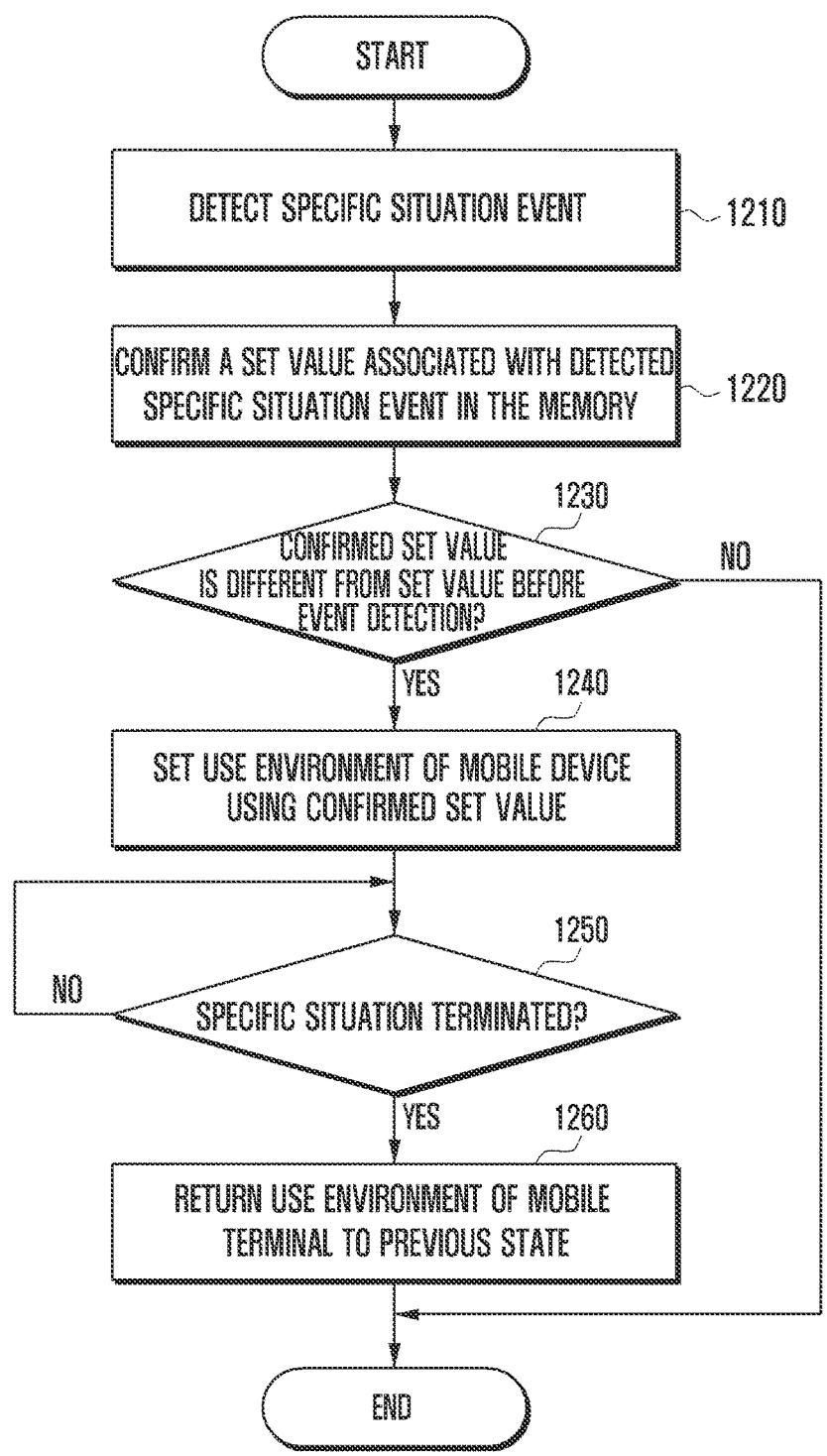
FIG. 12 is a flowchart illustrating a method for setting a use environment in a mobile device according to an embodiment of the present disclosure.

FIG. 12 is a flowchart illustrating a method for setting a use environment in a mobile device according to an embodiment of the present disclosure. Table 1 illustrates a method of setting a use environment of a mobile device according to the embodiment of the present disclosure.

TABLE 1

| Driving mode (stored in memory) set by the user in a specific situation where car cradle is connected to mobile terminal | Driving mode before car cradle is connected | Driving mode after car cradle is connected | Driving mode after car cradle is separated |
| --- | --- | --- | --- |
| ON | ON | ON | ON |
| ON | OFF | ON | OFF |
| OFF | ON | OFF | ON |
| OFF | OFF | OFF | OFF |

Referring to FIG. 12, the controller 180 detects an event indicating the occurrence of the specific situation at operation 1210.

If the specific situation event is detected, the controller 180 reads a user-customized page corresponding to the specific situation from the memory 130, and controls the touch screen 110 to display the read page.

Further, if the specific situation event is detected, the controller 180 confirms a first preset environment value (that is, information collected at operation 220 of FIG. 2 corresponding to the generated specific situation event from the memory 130 at operation 1220.

The controller 180 compares the first preset environment value with a second preset environment value before the specific situation event is detected at operation 1230. When the first preset environment value is different from the second preset environment value, the controller 180 sets a use environment of the mobile device 100 using the first preset environment value at operation 1240. For example, referring to Table 1, when a driving mode before a car cradle is connected is "OFF" (i.e., a preset value before the specific situation event is detected) and the driving mode stored in the memory 130 is "ON" (i.e., the confirmed preset value), the controller 180 sets the driving mode to "ON".

The controller 180 determines whether the specific situation is terminated at operation 1250. When the specific situation is terminated, the controller 180 returns the use environment of the mobile terminal 100 to a previous state at operation 1260. For example, the controller 180 sets the user environment of the mobile device 100 using the second preset environment value. For example, referring to Table 1, if the driving mode before the car cradle is connected is ON and the driving mode after the car cradle is connected is OFF, the controller 180 returns the driving mode to 'ON'. In addition, when the specific situation is terminated, the controller 180 terminates display of a corresponding page and controls the touch screen 110 to display the default page.

The foregoing method for processing a user-customized page of the present disclosure may be implemented in an executable program command form by various computer means and be recorded in a non-transitory computer readable recording medium. In this case, the non-transitory computer readable recording medium may include a program command, a data file, and a data structure individually or a combination thereof. In the meantime, the program command recorded in a recording medium may be specially designed or configured for the present disclosure or be known to a person having ordinary skill in a computer software field to be used. The non-transitory computer readable recording medium includes Magnetic Media, such as a hard disk, a floppy disk, or a magnetic tape, an Optical Media, such as a Compact Disc Read Only Memory (CD-ROM) or a Digital Versatile Disc (DVD), a Magneto-Optical Media, such as a floptical disk, and a hardware device, such as a ROM, a RAM, a flash memory for storing and executing program commands. The non-transitory computer readable recording medium can also be distributed over network coupled computer systems so that the computer readable code is stored and executed in a distributed fashion. Further, the program command includes a machine language code created by a complier and a high-level language code executable by a computer using an interpreter. The foregoing hardware device may be configured to be operated as at least one software module to perform an operation of the present disclosure.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

As described above, according to the method for processing a user-customized page and the mobile device applied to the same, the present disclosure automatically generates and displays the user-customized page. Further, the present disclosure generates and displays a user-customized page suited to a use pattern of a user with respect to a mobile device. When a preset specific situation (i.e., separation of a pen for touching the touch screen from the mobile device) occurs, the present disclosure collects mobile device use information in a corresponding specific situation and generates and displays a page using the collected information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a mobile device, the method comprising:
   displaying a screen of a first application while the mobile device is in an unlocked state and a stylus pen is disposed in an insertion hole of the mobile device, the insertion hole being configured to receive the stylus pen;
   while the screen of the first application is displayed, detecting at least partial removal of the stylus pen from the insertion hole;
   when the at least partial removal of the stylus pen is detected:
      collecting information including a previously generated handwritten memo in associated with a second application acquired before detection of the at least partial removal of the stylus pen,
      executing the second application with maintaining execution of the first application, and
      displaying a screen of the second application that includes the previously generated handwritten memo;
   while the screen of the second application is displayed, detecting at least partial insertion of the stylus pen into the insertion hole; and
   when the at least partial insertion of the stylus pen is detected:
      removing display of the screen of the second application, and
      displaying the screen of the first application.

2. The method of claim 1, further comprising:
   in response to detecting the removal of the stylus pen, collecting, by the at least one processor, use information with respect to the mobile device,
   wherein the collecting of the use information further comprises collecting the use information if a situation where the mobile device communicates with a second external device occurs.

3. The method of claim 2, wherein the collecting of the use information further comprises collecting at least one of information on an application, information on a function executed among functions of the application, data generated by the executed function, data received from the second external device by the executed function, or a preset environment value of the mobile device.

4. A mobile device comprising:
   a stylus pen configured to be disposed in an insertion hole of the mobile device;
   a display;
   a memory;
   a transceiver configured to communicate with a second external device; and
   at least one processor configured to:
      control the display to display a screen of a first application while the mobile device is in an unlocked state and the stylus pen is disposed in the insertion hole,
      detect at least partial removal of the stylus pen from the insertion hole while the screen of the first application is displayed,
      when the at least partial removal of the stylus pen is detected:
         collect information including a previously generated handwritten memo in associated with a second application acquired before detection of the at least partial removal of the stylus pen, and
         execute the second application with maintaining execution of the first application, and
         control the display to display a screen of the second application that includes the previously generated handwritten memo, and
      when the at least partial insertion of the stylus pen is detected:
         control the display to remove display of the screen of the second application, and
         control the display to display the screen of the first application.

5. The mobile device of claim 4, wherein the at least one processor is further configured to, in response to the detecting of the removal of the stylus pen from the insertion hole while the screen is displayed, collect use information with respect to the mobile device.

6. The mobile device of claim 4, wherein the at least one processor is further configured to collect at least one of information on an application, information on a function executed among functions of the application, data generated by the executed function, data received from the second external device by the executed function, or a preset environment value of the mobile device.

7. A non-transitory processor readable medium for storing a computer program of instructions configured to be readable by at least one processor for instructing the at least one processor to execute a computer process for performing the method as recited in claim 1.

* * * * *